United States Patent
Burkatovsky (10) Patent No.: US 7,756,812 B2
(45) Date of Patent: Jul. 13, 2010

(54) ADAPTIVE INPUT-CELL CIRCUITRY USEFUL IN CONFIGURABLE ELECTRONIC CONTROLLERS

(75) Inventor: Vitaly Burkatovsky, Rishon Le Zion (IL)

(73) Assignee: Eastman Kodak Company, Rochester, NY (US)

( * ) Notice: Subject to any disclaimer, the term of this patent is extended or adjusted under 35 U.S.C. 154(b) by 957 days.

(21) Appl. No.: 11/472,142

(22) Filed: Jun. 21, 2006

(65) Prior Publication Data

US 2007/0063197 A1    Mar. 22, 2007

Related U.S. Application Data

(60) Provisional application No. 60/719,447, filed on Sep. 22, 2005.

(51) Int. Cl.
*G06F 19/00* (2006.01)
*G06B 19/18* (2006.01)

(52) U.S. Cl. ........................................... 707/7; 701/114
(58) Field of Classification Search ................. 348/500; 700/7, 53, 28; 701/114, 115, 102
See application file for complete search history.

(56) References Cited

U.S. PATENT DOCUMENTS

| | | | |
|---|---|---|---|
| 5,014,238 A | 5/1991 | McLeish et al. | |
| 5,276,630 A | 1/1994 | Baldwin et al. | |
| 5,306,995 A | 4/1994 | Payne et al. | |
| 5,339,022 A | 8/1994 | Fleming et al. | |
| 5,412,291 A | 5/1995 | Payne et al. | |

(Continued)

FOREIGN PATENT DOCUMENTS

DE    101 40 748 A1    3/2003

(Continued)

OTHER PUBLICATIONS

Auto Enginuity, "Scan Tool", www.autoenginuity.com/products.

(Continued)

*Primary Examiner*—Paulos M Natnael
(74) *Attorney, Agent, or Firm*—Roland R. Schindler, II (57) ABSTRACT

A method for operating an input-cell comprises: receiving a sensor input signal, a digital-bias first control input and a second control input and, using a first resistor network to apply an analog pull-up bias to the sensor input signal when the bias of the first control input is in a first digital state. To provide a path for at least a portion of the first resistor network to a ground to cause the first resistor network to apply a pull-down bias to the sensor input signal when the bias of the first control input is in a second digital state. Receiving a voltage reference and an input waveform signal; using a second resistor network to apply to the input waveform signal to a comparator when the bias of the second control input is in a first digital state and, to apply a biased and attenuated input waveform signal to the comparator when the bias of the second control input is in a second digital state. Comparing the biased sensor input signal to the waveform applied by the second resistor network to determine an input-cell output, so that the input-cell can convert the sensor input signal to a time-based parameter.

16 Claims, 7 Drawing Sheets

U.S. PATENT DOCUMENTS

| | | |
|---|---|---|
| 5,493,650 A | 2/1996 | Reinke et al. |
| 5,950,709 A | 9/1999 | Krueger et al. |
| 6,181,140 B1 | 1/2001 | Vokey et al. |
| 6,459,271 B1 | 10/2002 | Vokey et al. |
| 6,646,454 B2 | 11/2003 | Watkins |
| 6,739,145 B2 | 5/2004 | Bhatnagar |
| 6,868,357 B2 | 3/2005 | Furse |
| 7,088,860 B2* | 8/2006 | Matsugu et al. ............. 382/181 |
| 7,089,088 B2* | 8/2006 | Terry et al. ................. 700/276 |
| 7,277,763 B2* | 10/2007 | Burkatovsky .................. 700/7 |
| 7,505,847 B2* | 3/2009 | Burkatovsky ............... 701/114 |
| 2001/0015918 A1 | 8/2001 | Bhatnagar |
| 2001/0039190 A1 | 11/2001 | Bhatnagar |
| 2005/0065618 A1 | 3/2005 | Burkatovsky |

FOREIGN PATENT DOCUMENTS

| | | |
|---|---|---|
| WO | WO 91/02300 | 2/1991 |
| WO | WO 92/04813 | 3/1992 |
| WO | WO 02/37298 | 5/2002 |
| WO | WO 02/037298 A2 | 10/2002 |
| WO | WO 2005/029207 | 3/2005 |
| WO | WO 2006/008732 | 1/2006 |

OTHER PUBLICATIONS

Freescale Semiconductor, Inc., (Motorola, Inc.), "Multiple Switch Detection Interface", Rev. 3.0, Aug. 2003, pp. 1-28, www.freescale.com.

A. Karsten. "Individualisten Minikoppler Fuer Die Interfacetechnik", Elektrotechnik, Vogel Verlag K.G., Wurzburg. DE. Apr. 14, 1994, vol. 76, No. 4, pp. 40, 42, XP000447795, ISSN: 1431-9578.

* cited by examiner

ADAPTIVE INPUT-CELL CIRCUITRY USEFUL IN CONFIGURABLE ELECTRONIC CONTROLLERS

CROSS REFERENCE TO RELATED APPLICATIONS

This is a 111A Application of Provisional Application Ser. No. 60/719,447, filed Sep. 22, 2005 in the name of Vitaly Burkatovsky. This application is related to U.S. Ser. No. 10/667,640, entitled CONFIGURABLE CONTROLLER, filed Sep. 22, 2003 in the name of Vitaly Burkatovsky; and U.S. Ser. No. 11/472,203, entitled THE USE OF A CONFIGURABLE ELECTRONIC CONTROLLER FOR CAPACITANCE MEASUREMENTS AND CABLE BREAK DETECTION in the name of Vitaly Burkatovsky, filed concurrently herewith.

FIELD OF THE INVENTION

The present invention relates to an input-cell circuit of the type that can be used by an electronic controller.

BACKGROUND OF THE INVENTION

Electronic controllers are widely used in industrial automation and automotive applications, usually custom designed for specific groups of input sensors, output devices and control applications. Configurable Electronic Controllers (CEC), as described for example in WO 2005/029207 filed by Burkatovsky on Jul. 12, 2004 and WO 2006/008732 filed by Burkatovsky on Jul. 7, 2005 are considered particularly versatile, enabling design of electronic controllers capable of measuring a verity of digital and analogue sensors, as well as controlling a range of output devices such as motors, solenoids and indicators. US 2001/0039190 entitled "Configurable Electronic Controller" filed by Bhatnagar on Dec. 21, 2000, US 2001/0015918 entitled "Configurable Electronic Controller for Appliances" filed by Bhatnagar on Dec. 21, 2000, WO91/02300 entitled "Universal Analog Input" filed by Pascucci et al. on Jul. 12, 1990, U.S. Pat. No. 5,014,238 entitled "Universal Input/Output Device" filed by McLeish et al. on Nov. 28, 1989 and, technical brochures related to the SSP1492 sensor (Sensor Platforms Inc, California, U.S.A.) describe input circuitry in other devices based on or related to configurable electronics.

CEC devices use an input-cell to provide an electrical interface between the CEC and sensors connected to the device. One example of such a prior art input-cell is illustrated in FIG. 1, which shows, schematically, an embodiment of a prior art input-cell 240 as described and shown with reference to FIG. 4 of WO 2005/029207.

Figure 1:
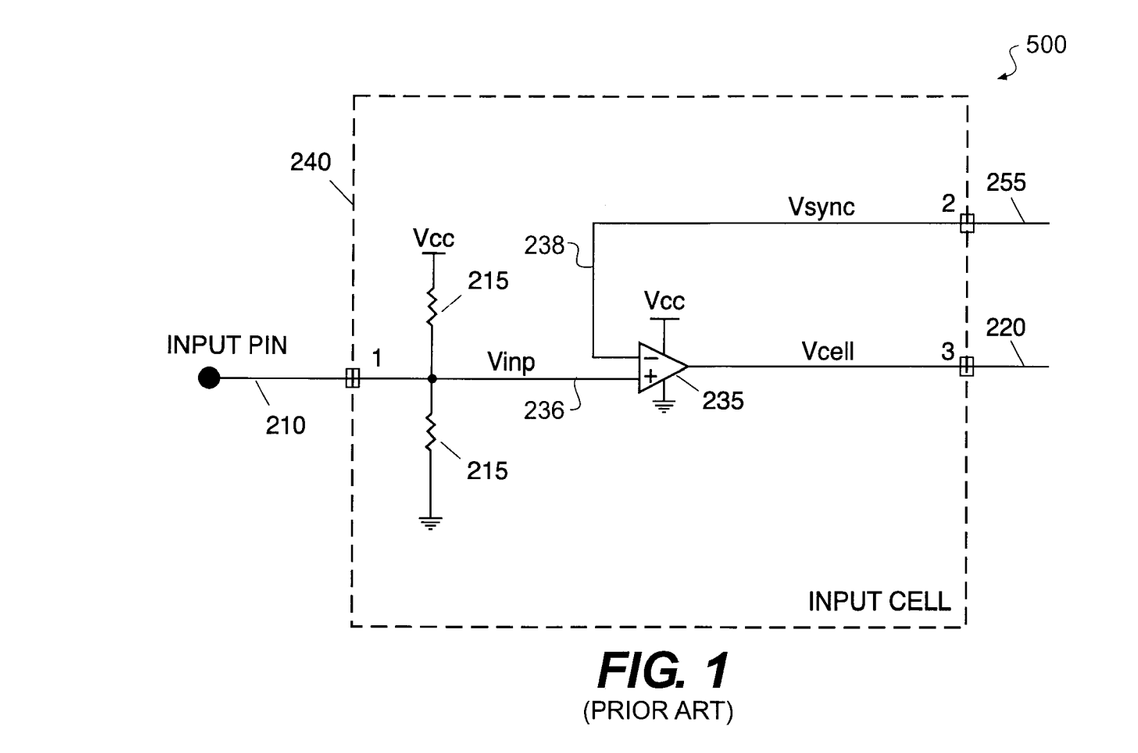
FIG. 1 is a schematic drawing of a prior art input-cell circuitry.

As is shown in FIG. 1, prior art input-cell 240 has an input pin 210 that is connected to a sensor (not shown). The sensor (not shown) provides a signal at a first input 236 of comparator 235. A synchronization voltage Vsync is received along synchronization input 255 from a CEC (not shown), and provided to a second input 238 of comparator 235 providing an output voltage Vcell to the CEC (not shown). Output voltage Vcell indicates which of first input 236 and second input 238 has greater amplitude. As is shown in FIG. 1, input-cell 240 has optional resistors 215 that are intended to bias the first input 236 of the comparator 235. Optional resistors 215 generally have a relatively high resistance value.

Input-cell 240 of FIG. 1 is of a type of input-cell that is particularly useful in measuring optical position sensors, analogue voltage output sensors and proximity sensors having specific output parameters. However, other sensors such as thermistors, magnetic Hall-Effect and integrated IC sensors (intended for pressure, acceleration and gas concentration) have different output parameters and require the use of a different type of input-cell to receive signals having the output parameters of the signals provided by such other sensors.

In prior art practice, it has been common to provide programmable controllers such as Allen Bradley Programmable Logic controllers with replaceable input-cells so that the user of the controller can select input-cells that are specially adapted to work with particular sensor types applied in a particular application. This solution however requires that the programmable logic controller be specially adapted to receive replaceable input-cells and further requires that a user have access to the exact input-cells that are required for a particular application. Such a solution also adds weight and cost the controller to support replaceable connections of the type necessary to allow interchangeability.

Further, there is a desire to provide CECs that do not require separate attachments so that a CEC that is flexible enough to perform a variety of tasks using a wide range of sensors can be provided in a single enclosure, that can be provided on a single substrate such as a printed circuit board or semiconductor pattern, or can be assembled, fabricated, manufactured or formed using common processes.

Thus, both for conventional Programmable Logic Controllers and CECs there is a need for an adaptive generic input-cell, which can serve a great number of different input sensors.

SUMMARY OF THE INVENTION

In one aspect of the invention, a configurable control system is provided. The configurable control system comprises: a synchronization control module; a plurality of configurable signal acquisition modules connected with the synchronization control module; a control logic connected with the plurality of signal acquisition modules; a plurality of identical input-cells respectively connected with the plurality of signal acquisition modules and with a respective plurality of input pins of the controller; and a synchronization signal generator connected with the synchronization control module and with the plurality of input-cells, with each one of the plurality of input-cells being operable to convert input signal parameters into time based parameters and with each of the signal acquisition modules being configured to convert the time based parameters to a required digital form. The input-cell comprises: a comparator having a first input, a second input and an output; a first combination of resistors connected in series between a first reference voltage source and the first input of the comparator; a first electromagnetically controlled switch connected in series between at least one of the resistors in the combination and a ground wherein the first electromagnetically controlled switch is operated in response to a bias control signal from the signal acquisition module to switch between one switch state causing a pull-up bias to be applied to the input signal pin and another switch state causing a pull-down bias to be applied at the input signal pin; a second combination of resistors connected between a second reference voltage source, an input to receive a waveform signal from the synchronization control module and the second input of the comparator; and a second electromagnetically controlled switch connected in series between at least one of the resistors in the second combination and the second voltage source the second electromagnetically controlled switch being selectively switchable, in response to a bias control signal from the signal acquisition module, between one switch state causing the waveform signal to be applied to the comparator and another switch state causing bias and attenuation of the waveform signal to be applied to the comparator.

In another aspect of the invention, a method of acquiring a plurality of signals is provided. The method comprises the steps of: providing a synchronization control module, configuring a plurality of configurable signal acquisition modules connected with the synchronization control module; providing a control logic connected with the plurality of signal acquisition modules; providing a plurality of identical input-cells respectively connected with the plurality of signal acquisition modules; providing a synchronization signal generator connected with the plurality of input-cells acquiring a plurality of input signals, each the signal acquired by one of the plurality of identical input-cells; converting the acquired input signal parameters into a plurality of time-based parameters; and converting the plurality of time-based parameters into a digital form, wherein the converting of the acquired input signal parameters into a plurality of time-based parameters is controlled by the first and second electromagnetically controlled switches.

In another aspect of the invention, a method for operating an input-cell is provided. The method comprises the steps of: receiving a sensor input signal to a comparator and digital-bias first and second control inputs; using a first resistor network to apply an analog pull up bias to the sensor input signal when the bias of the first control input is in a first digital state and to provide a path for at least a portion of the resistor network to a ground to cause the first resistor network to apply a pull down bias to the sensor input signal when the bias of the first control input is in a second digital state; receiving a voltage reference and a comparator input waveform signal; using a second resistor network to apply to the comparator the input waveform when the bias of the second control input is in a first digital state and a biased and attenuated input waveform when the bias of the second control input is in a second digital state; and comparing the biased sensor input signal to the waveform applied by the second resistor network to determine an input-cell output, so that the input cell can convert the sensor input signal parameters into a time-based parameter.

In still another aspect of the invention, an input-cell is provided. The input-cell comprises: a comparator having a first input, a second input and an output, the comparator generating an output signal based upon a comparison of the signals at the first input and the second input; a sensor signal acquisition circuit having: a sensor signal input to receive a signal from a sensor and to provide the sensor signal to the first input of the comparator; a resistor network comprising a plurality of bias resistors connected in series between a first reference voltage and the sensor signal input; a first electro-magnetically controlled switch connected between at least two of the plurality of bias resistors and a ground, the first electromagnetically controlled switch transitioning in response to a first bias control signal between a condition wherein the first electromagnetically controlled switch provides an electrical connection between the resistor network and ground and a condition wherein the first electromagnetically controlled switch does not provide such an electrical connection; and an externally controllable reference control circuit comprising: a synchronization input connected to the second input of the comparator with a first reference resistor connected therebetween; and a second electromagnetically controlled switch connected between a second reference voltage source and the second input of the comparator with a second reference resistor therebetween, the second electromagnetically controlled switch transitioning in response to a second bias control signal between a condition that defines an electrical connection between the second reference voltage, the second reference resistor and the second input of the comparator and a condition that does not define such an electrical connection, so that the synchronization input at the second input of the comparator can be biased and attenuated.

In a further aspect of the invention, an input-cell is provided. The input-cell comprises: an analog comparator having a first input, a second input and an output the comparator adapted to generate a signal at an output that indicates whether the amplitude of a signal at the first input is greater than the amplitude of the signal at the second input; a first switch having a first control line adapted to receive a first digital control signal and to transition between an open state and a closed state in response to the first control signal the first switch connected to the first input and to a first resistor network to apply a pull-up bias at the first input when the switch is in one of the open or closed states and to apply a pull-down bias at the input signal when the switch is in a different state; and a second switch having a second control line adapted to receive a second digital control signal and to transition between an open state and a closed state in response to the second control signal; the second switch being electrically connected to a synchronization input, the second input and a second resistor network to subject a waveform provided by the synchronization input to a different bias and attenuation when the second switch is closed than when the second switch is open.

In still another aspect of the invention, an input-cell is provided. The input-cell comprises: a comparator having a first input, a second input and an output, the comparator generating an output signal based upon comparison of signals at the first and second input; a first resistor and second resistor connected in series between a first voltage reference source and a sensor input connected to the first input of the comparator; a first switch connected to the first and second resistors and a ground, the first switch adapted to receive a signal from a first control line and to switch in response to the received signal so that the first and second resistors provide different biases to the sensor input on the first input when the first switch is closed and when the first switch is open; a third resistor and fourth resistor connected in series between a second reference voltage source; and a second switch and a synchronization input, the third resistor and fourth resistor connected to the second comparator input; the second switch being connected to a second control line and to receive a signal from the second control line to either apply the waveform input to the second comparator input or apply a biased and attenuated waveform input to the second comparator input, so that a control circuit outside of the input-cell but connected thereto can selectively adjust the bias applied to the sensor input and adaptively define the signal to which the sensor input is compared.

BRIEF DESCRIPTION OF THE DRAWINGS

The invention is herein described, by way of example only, with preference to the accompanying drawings, wherein.

DETAILED DESCRIPTION OF THE INVENTION

An adaptive input-cell and a configurable controller system using the adaptive input-cell are provided.

It is to be understood that the invention is defined by the claims and not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. Further, it will be appreciated that any specific resistor values or other described ranges of component performance characteristics are exemplary only.

Figure 2:
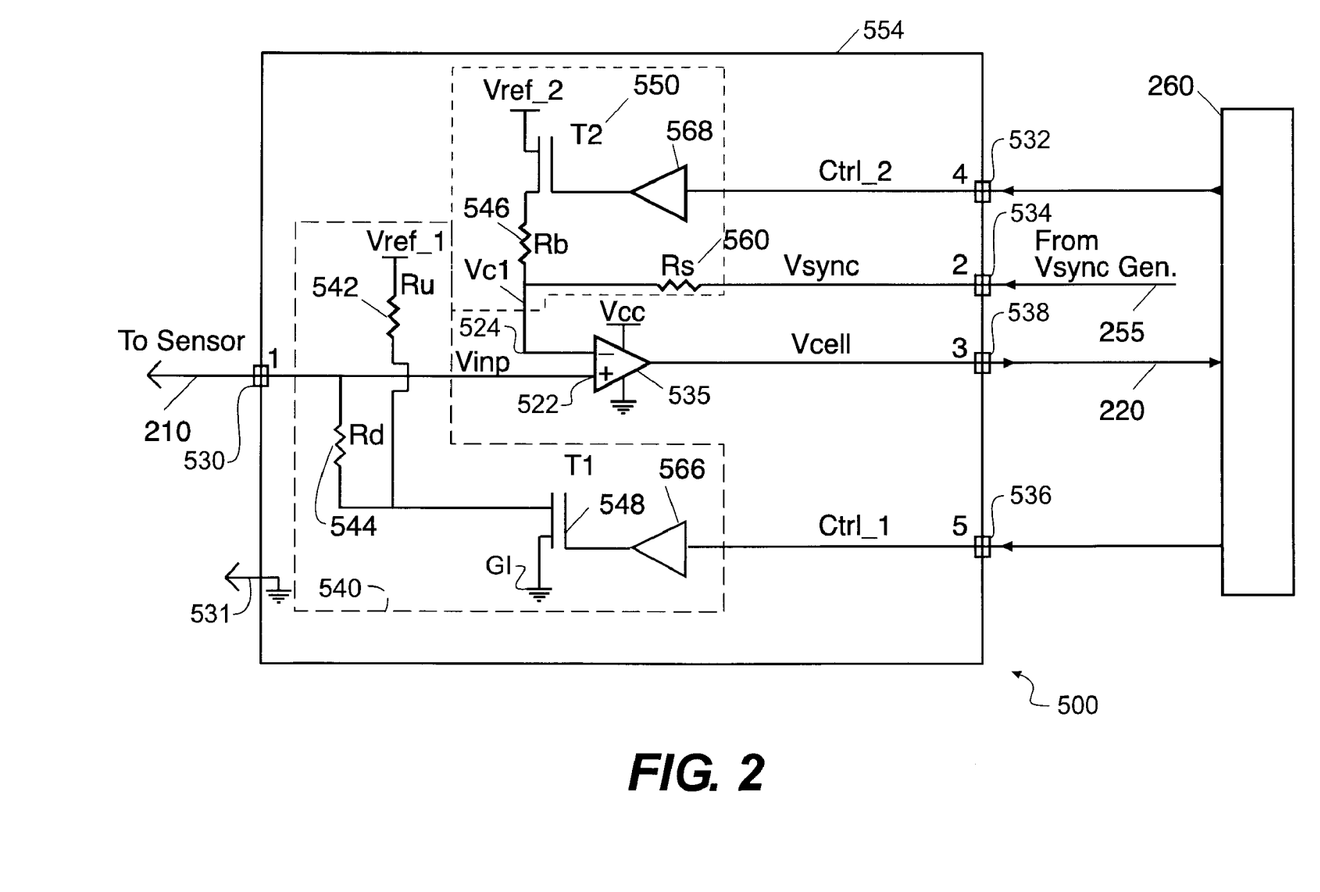
FIG. 2 is a schematic drawing of a preferred embodiment of an adaptive input-cell circuitry, according to the present invention.

FIG. 2 schematically illustrates one embodiment of an adaptive input-cell 500. In the embodiment of FIG. 2, adaptive input-cell 500 has a plurality of inputs and outputs including a pair of sensor inputs 530 and 531, a first control input 536, a second control input 532, a waveform input 534 and an output 538. A comparator 535 is provided having two inputs: a first input 522, and a second input 524. First input 522 is connected to sensor input 530 and second input 524 is connected by way of resistor Rs 560 to a waveform input 534. Comparator 535 generates an output voltage Vcell at output 538. In one example, comparator 535 generates an output voltage Vcell at output 538 based upon an analog comparison of the analog amplitude of the signals at first input 522 and second input 524.

An input "pull-up" or "pull-down" selection circuit 540 is connected to first input 522 and applies an analog pull up bias or an analog pull down bias to signals received at sensor input 530 to form an input voltage Vinp at first input 522 of comparator 535. In the embodiment illustrated in FIG. 2, selection circuit 540 comprises resistors Ru 542 and Rd 544 and first electromagnetically controlled switch 548. In this embodiment, resistors Ru 542, Rd 544 form a first resistor network between a first source of a voltage reference Vref_1 and first input 522 of comparator 535. First electromagnetically controlled switch 548 is arranged between resistors Ru 542 and Rd 544 and a ground G1. Further, in one example of the embodiment of FIG. 2, resistor Ru 542 can have a resistance that is in the range of 2 to 10 Kohm while resistor Rd 544 can have a resistance in the range of 100 to 500 Ohm.

First electromagnetically controlled switch 548 is switchable between one state wherein electromagnetically controlled switch 548 provides an electrical path to a ground G1 and another state wherein first electromagnetically controlled switch 548 does not provide an electrical path to ground G1. Where a path is provided, a pull-down bias is applied to signals at first input 522 and, where no path is provided, a pull-up bias is applied to signals at first input 522. In one example of the embodiment of FIG. 2, first electromagnetically controlled switch 548 is illustrated as a transistor T1 and can comprise for example an N-Channel FET Zetex Semiconductors type ZVN3306F transistor.

Figure 3:
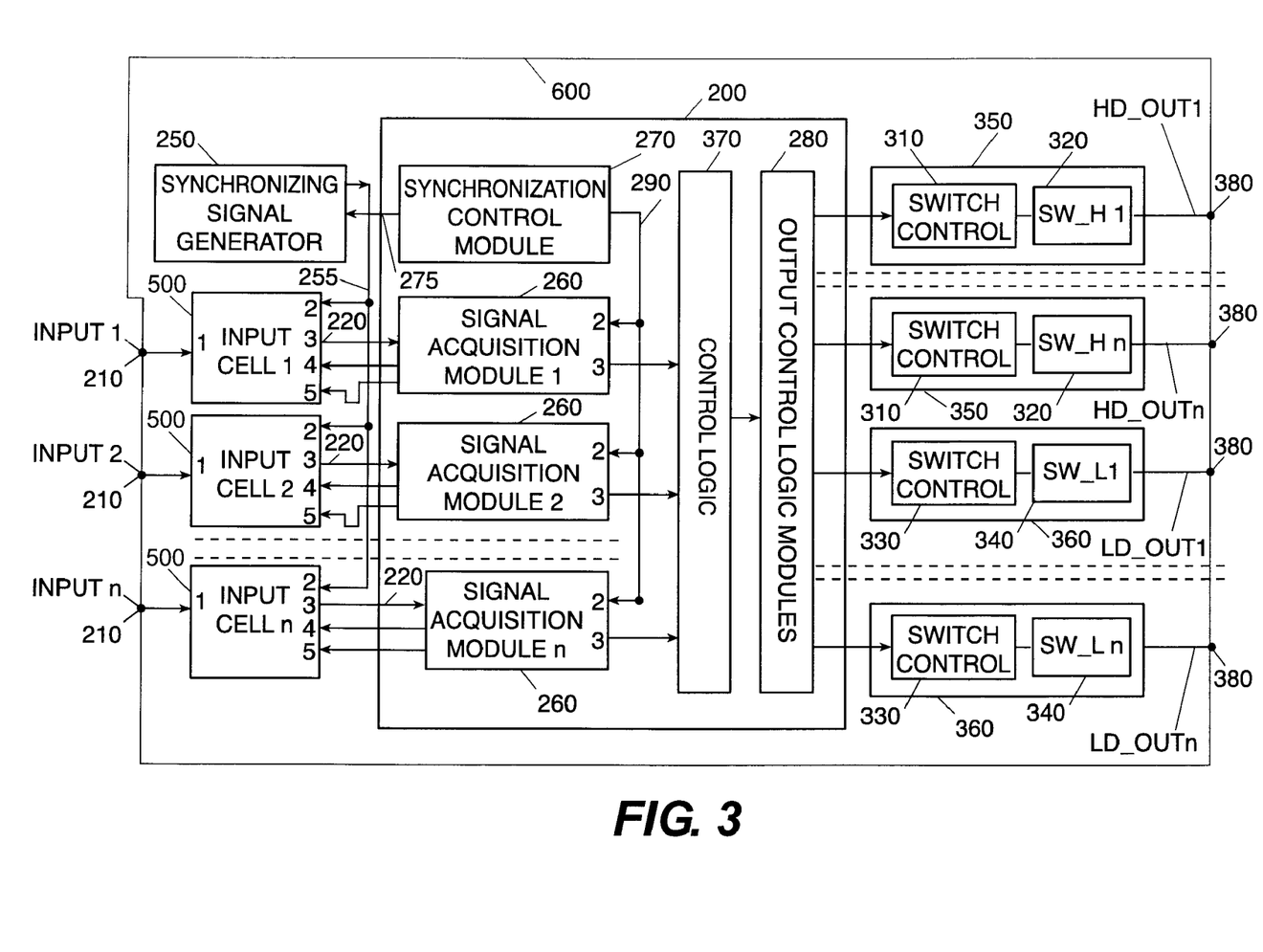
FIG. 3 is a schematic block-diagram of the controller including the adaptive input-cell circuitry, according to the present invention.

In this embodiment, first electromagnetically controlled switch 548 operates in response to a first control signal Ctrl_1 coming from a PLD 200 (Programmable Logic Device, for example FPGA) via signal acquisition modules 260 (shown in FIG. 3). First electromagnetically controlled switch 548 receives the first control signal Ctrl_1 by way of first control input 536.

A second network of resistors shown as resistors Rb 546 and Rs 560, and second electromagnetically controlled switch 550 configure a reference control circuit 554. Resistor Rb 546 and second electromagnetically controlled switch 550 are used for acquisition of a synchronization voltage Vsync that is provided by way of waveform input 534. By way of example, and not limiting, reference control circuit 554 is used to provide a reference signal for acquisition of input voltage Vinp from a speed or PWM sensor.

Resistor Rs 560 provides a second resistor network between a source of second voltage reference Vref_2 and second input 524 of comparator 535. Second electromagnetically controlled switch 550 is connected in series between source of second voltage reference Vref_2 and Rb 546 and second input 524 of comparator 535. Second electromagnetically controlled switch 550 is arranged so that it can change between a state that creates an electrical path from the source of second voltage reference Vref_2 to resistor Rb 546 and a state that does not provide such an electrical path. Second electromagnetically controlled switch 550 changes between these states in response to a second control signal Ctrl_2 that is provided by digital unit 200 and signal acquisition module 260 at second control input 532.

In operation, second control signal Ctrl_2 and a synchronization voltage Vsync are received from digital unit 200 of FIG. 3. The second control signal Ctrl_2 causes the second electromagnetically controlled switch 550 to enter, for example, the state that creates an electrical path to the source of second voltage reference Vref_2. This provides a biased and attenuated form of synchronization voltage Vsync at second input 524 of comparator 535. The other state of second electromagnetically controlled switch 550 creates an open between source of second voltage reference Vref_2 and second input 524 of comparator 535. For convenience, the resultant synchronization voltage Vsync at second input 524 will be referred to herein as the reference voltage Vc1.

In one non-limiting example embodiment, second electromagnetically controlled switch 550 can be a transistor T2, such as a P-Ch FET Zetex Semiconductors type BS250F, while an example of resistor Rb 546 can have a resistance of between about 10 to 200 Ω. As is also shown in FIG. 2, optional buffers 566 and 568 can be provided to protect against the transmission of unanticipated or unwanted electromagnetic pulses.

It will be appreciated that, in other embodiments, first electromagnetically controlled switch 548 or second electromagnetically controlled switch 550 can comprise any switch that can transition from a state that does not conduct electricity to a state that does conduct electricity in response to an electrical signal, an optical signal, or a magnetic signal can, for example, take an electromagnetically controlled form including, but not limited to, a relay, an opto-coupler, a current controlled switch, a voltage controlled switch or a P-channel field effect transistor. Further, it will be appreciated that the cited resistance values are exemplary only and that other values can be used that achieve results that are consistent with the functionality described herein and that the selection of such other values is within the scope of one of ordinary skill in the art in view of the teachings herein.

It will also be appreciated that first control signal Ctrl_1 and second control signal Ctrl_2 can be provided in either of an analog form or in a digital form as one of a comparatively high signal and a comparatively low signal. The use of a first control signal Ctrl_1 or second control signal Ctrl_2 in a digital form can be advantageous in certain instances in that a configurable control system 600 will typically be adapted to make control determinations and generate control signals that are in digital form.

Specifically, FIG. 1 is a general block diagram of one embodiment of a configurable control system 600 that uses a plurality of adaptive input-cells 500. Configurable control system 600 is substantially similar to the controller illustrated in FIG. 3 of WO 2005/029207, except for the adaptive input-cell 500, which replaces the original basic input-cell 240. Configurable control system 600 comprises a synchronizing signal generator 250, configurable digital unit 200, such as FPGA or CPLD, which comprises at least synchronization control module 270, control logic module 370, a number of signal acquisition modules 260, configured to accept signals coming from input pins 210 of configurable control system 600 through adaptive input-cells 500. Adaptive input-cells 500 can be identical or can vary.

Configurable output control logic modules 280 can be configured to provide control of the loads connected to the output pins 380 of configurable control system 600, through high-side output drivers 350 and/or low-side output drivers 360. In this embodiment, such high-side output drivers 350 each have a high-side switch control 310 and high-side switch 320, while such low-side output drivers 360 each have a low-side switch control 330 and low-side switch 340.

The synchronization control module 270 of configurable control system 600 is configured to generate basic time-dependent signals, in order to synchronize the work of the adaptive input-cells 500 and signal acquisition modules 260. Such synchronization is needed for conversion of input signal values to time-based parameter, (e.g. pulse width, delay, duty cycle, frequency, etc.) by adaptive input-cells 500, and then for converting these time-based parameters to digital form by means of configured signal acquisition modules 260. One possible implementation of synchronization control module 270 may be, for example, a counter, which counts incoming pulses with constant interval between them. The sequence of such pulses can be obtained from the system clock, for example. The output reference data 290 of synchronization control module 270 is connected to each of the signal acquisition modules 260 and also to synchronizing signal generator 250 as a sync data 275. Synchronizing signal generator 250 is implemented, for example, as a digital to analogue converter. synchronization control module 270 is connected to each of the signal acquisition modules 260 and also to synchronizing signal generator 250 as a sync data 275. While synchronization control module 270 is running, the value of the sync data 275, which is equal to output reference data 290, is periodically changed from 0 to its maximum value, which causes a saw-teeth shape synchronization voltage Vsync on the synchronization input 255 of synchronizing signal generator 250. This voltage is transferred to the second input of adaptive input-cells 500. First input 522 of each adaptive input-cell 500 is connected to the corresponding input pin of configurable control system 600 respectively. The comparator output signal 220 of adaptive input-cell 500 is connected to the input of corresponding signal acquisition module 260. The implementation of configurable signal acquisition modules 260 may vary according to the type of signal that needs to be accepted and thus supports the different peripheral environments.

The function of adaptive input-cell 500 will be demonstrated by analyzing the signal acquisition method related to a range of exemplary sensor families.

Figure 4:
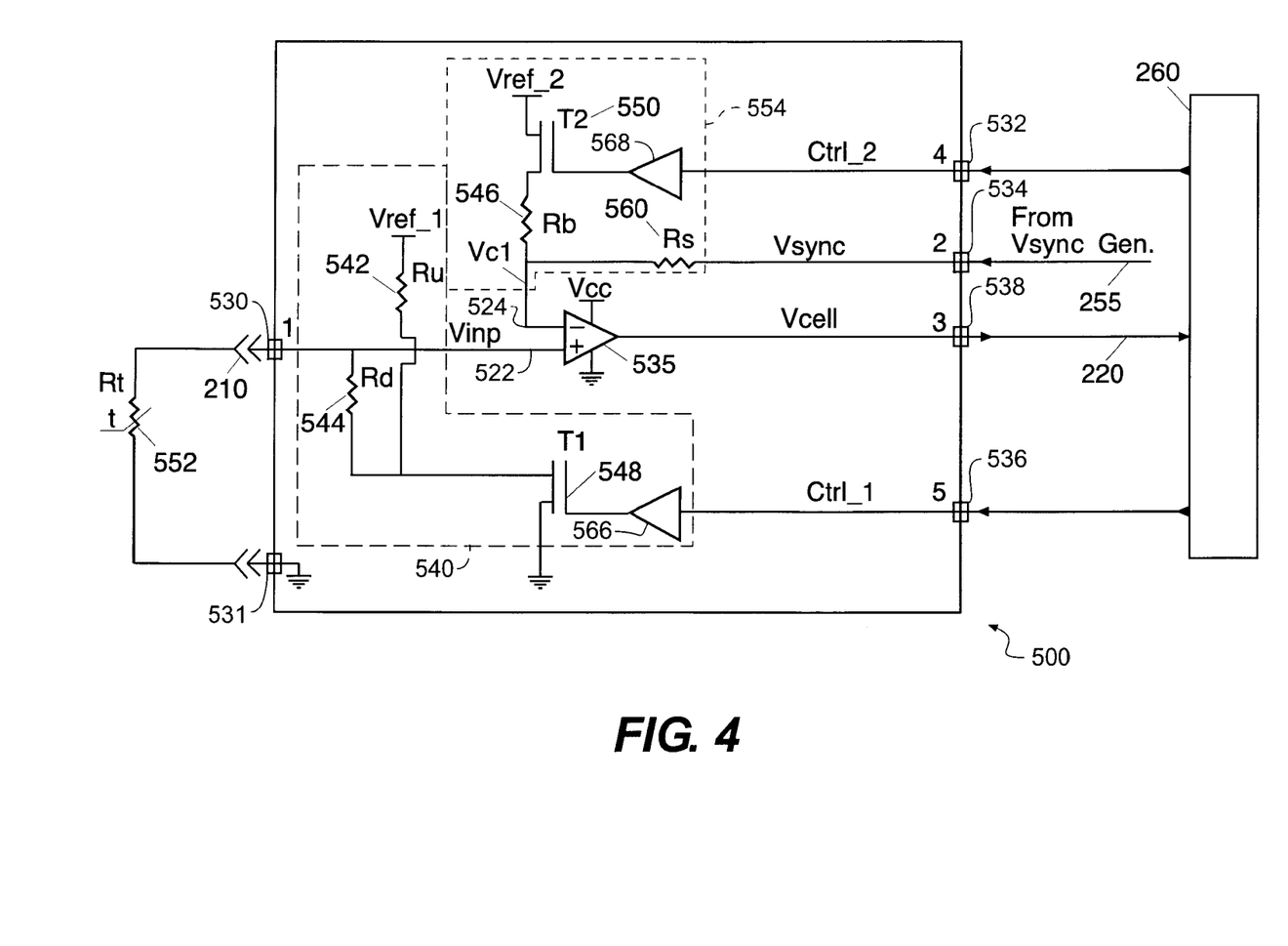
FIG. 4 is a schematic drawing of a preferred embodiment of the adaptive input-cell circuitry, according to the present invention, connected to a NTC resistor temperature sensor.

Signal Acquisition of a Temperature Sensor—NTC Resistor:

The connection of a Negative Temperature Coefficient (NTC) resistor to an adaptive input-cell 500 is shown in FIG. 4. To measure the NTC resistor Rt 552 the corresponding programmable logic is configured to support a Logic Low to control signal Ctrl_1 at first control input 536 and Logic High to second control signal Ctrl_2 at second control input 532 which turns-off the first and second electromagnetically controlled switches 548 and 550, respectively, shown in this embodiment as transistors T1 and T2 respectively. The "off" state of second electromagnetically controlled switch 550 determines the behavior mode of comparator 235 to follow the description in WO 2005/029207. The "off" state of first electromagnetically controlled switch 548 results in a current flow through the connected in-series resistors Ru 542, Rd 544 and Rt 552. The input voltage Vinp at first input 522, will be defined by first voltage reference source Vref_1 and a voltage-divider comprising known resistors Ru 542, Rd 544 and NTC resistor Rt 552. Measuring the input voltage Vinp at first input 522, as described in WO 2005/029207, enables the calculation of the resistor Rt 552 and the corresponding measured temperature. The calculation may be done by control logic module 370 of FIG. 3, using the known in the art formula:

$$Rt = [Vinp \times (Ru+Rd)]/[Vref\_1 - Vinp]$$

Speed or PWM Sensor Signal Acquisition:

As has been described in WO 2005/029207 signal measurement can be performed is based on conversion of the input voltage to a time-based parameter, with subsequent conversion to digital form by means of configurable logic. Typical frequencies of synchronization input 255 (FIGS. 2-5) are in the range of 50 to 100 KHZ.

Frequency (speed) or PWM (speed and direction) sensors, used in industrial and automotive control applications, require measurement of time-based parameters period between pulses, frequency or pulse width. In this case there is no need to make another conversion as the signal is received in the required digital form. The proposed embodiment of adaptive input-cell 500 in FIG. 4 allows the acquisition of time based parameter signals.

For this purpose, the configuration of programmable logic will assign to second control signal Ctrl_2 at second control input 532 a Logic Low, thus, setting second electromagnetically controlled switch 550 to a state that connects source of second voltage reference Vref_2 through resistor Rb 546 to second input 524 of comparator 235. The corresponding waveforms are schematically shown in FIG. 6 and further explained hereinafter.

Figure 5:
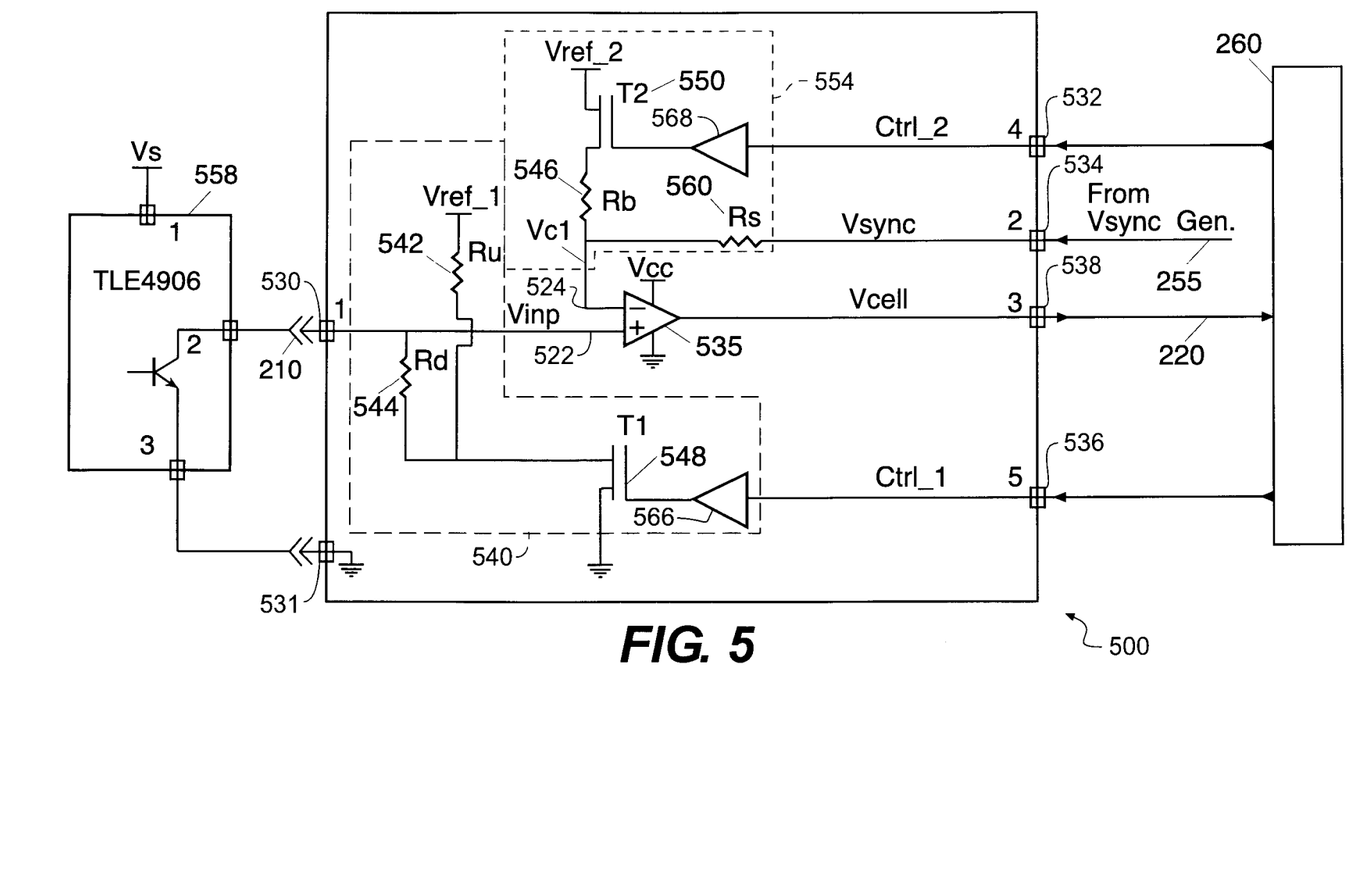
FIG. 5 is a schematic drawing of another preferred embodiment of the adaptive input-cell circuitry, according to the present invention, connected to an open collector Hall Effect speed sensor.

Speed Measurements by Open Collector Hall-Effect Sensors:

The connection of a speed sensor 558, for example Infineon Hall-Effect Sensor model TLE4906, to adaptive input-cell 500 is shown on FIG. 5. This type of sensor needs a pull-up resistor to provide normal operation conditions. This is achieved by configuring first control signal Ctrl_1 at first control input 536 to Logic Low. If the measured input frequency is relatively slow (less than few kHz) then second control signal Ctrl_2 at second control input 532 will be assigned a Logic High, and adaptive input-cell 500 will operate substantially similar to the prior art input-cell 240, and the measurement process will follow the description related to FIGS. 8 and 9 of WO 2005/029207.

If the measured frequency is relatively high (more than few kHz) then second control signal Ctrl_2 at second control input 532 will be assigned Logic Low. In this case Vc1, representing the reference voltage at second input 524 of comparator 535, will be determined by the saw-tooth synchronization voltage Vsync at waveform input 534 of adaptive input-cell 500, divided relative to source of second voltage reference Vref_2 by resistors Rs 560 and Rb 546. The voltage drop on closed second electromagnetically controlled switch 550 is negligible.

FIG. 6 shows schematically the relevant waveforms measured at various points of adaptive input-cell 500. Curve 1 of FIG. 6A represents synchronization voltage Vsync at waveform input 534, while curve 2 of FIG. 6B represents the resulting saw-tooth reference voltage Vc1 at second input 524 of comparator 535. The input voltage Vinp at first input 522 of comparator 535 is represented by curve 3 of FIG. 6B is defined by the output of speed sensor 558, swinging substantially between ground to a voltage of the source of the first voltage reference Vref_1. The fact that "High" input voltage Vinp will always be larger than the reference voltage Vc1 and "Low" input voltage Vinp will be always be smaller than the reference voltage Vc1 makes it possible to use comparator 535 for status detection of speed sensor 558. The output voltage Vcell of comparator 535, measured at output 538 is shown by curve 4 of FIG. 6C substantially coincides with the speed sensor 558 output status, thus enabling relatively high speed and PWM measurements. In this case, no further configuration is needed because the timing of output voltage Vcell is equal to sensor's timing. To suppress possible electronic noise an optional digital filter may be configured in the signal acquisition module 260 (not shown).

Figure 6A:
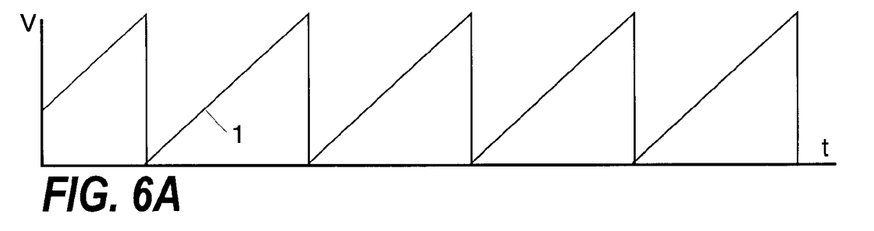
FIGS. 6A-6E show timing diagrams describing the functionality of the adaptive input-cell, as described in FIG. 5.
Figure 6B:
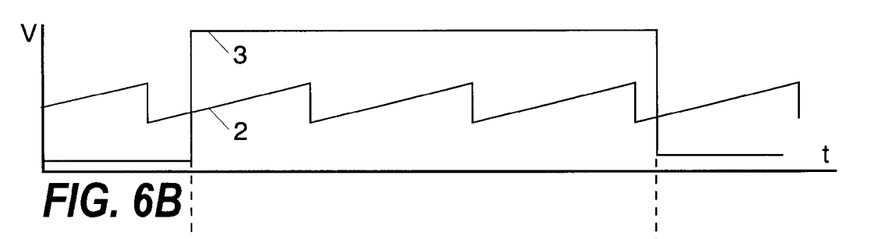
Figure 6C:
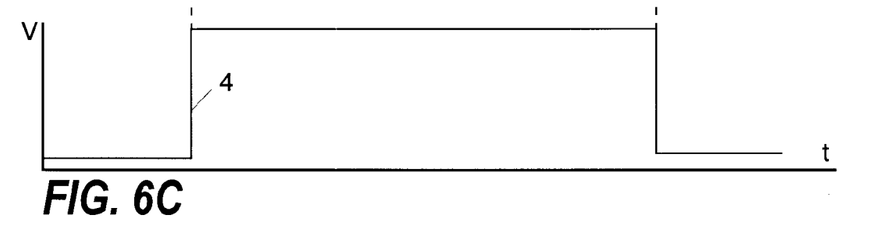
Figure 6D:
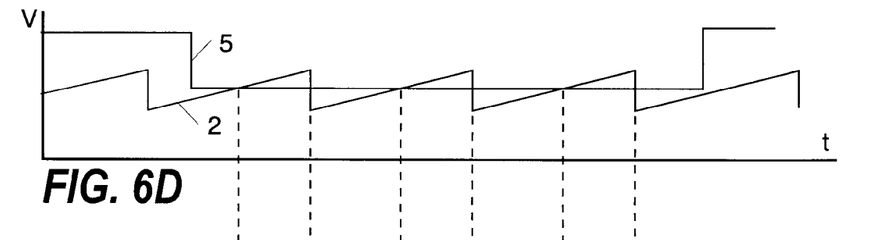
Figure 6E:
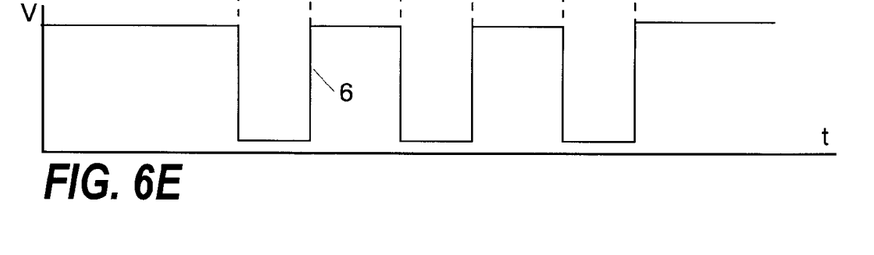

In abnormal situations, as shown by FIG. 6D curve 5, where due to a weak connection or due to other reasons the input voltage Vinp gets abnormal values within the "not determined" zone of comparator 535. The reference voltage Vc1 of comparator 535 is re-shown in FIG. 6D as curve 2. The resulting output voltage Vcell of the comparator 535, is shown in FIG. 6E as curve 6. This output is clearly different than the normal output of comparator 535 as shown in curve 4 of FIG. 6C, and signal acquisition module 260, if properly configured, can detect the waveform and frequency of curve 6 and signal a faulty speed sensor 558.

Figure 7:
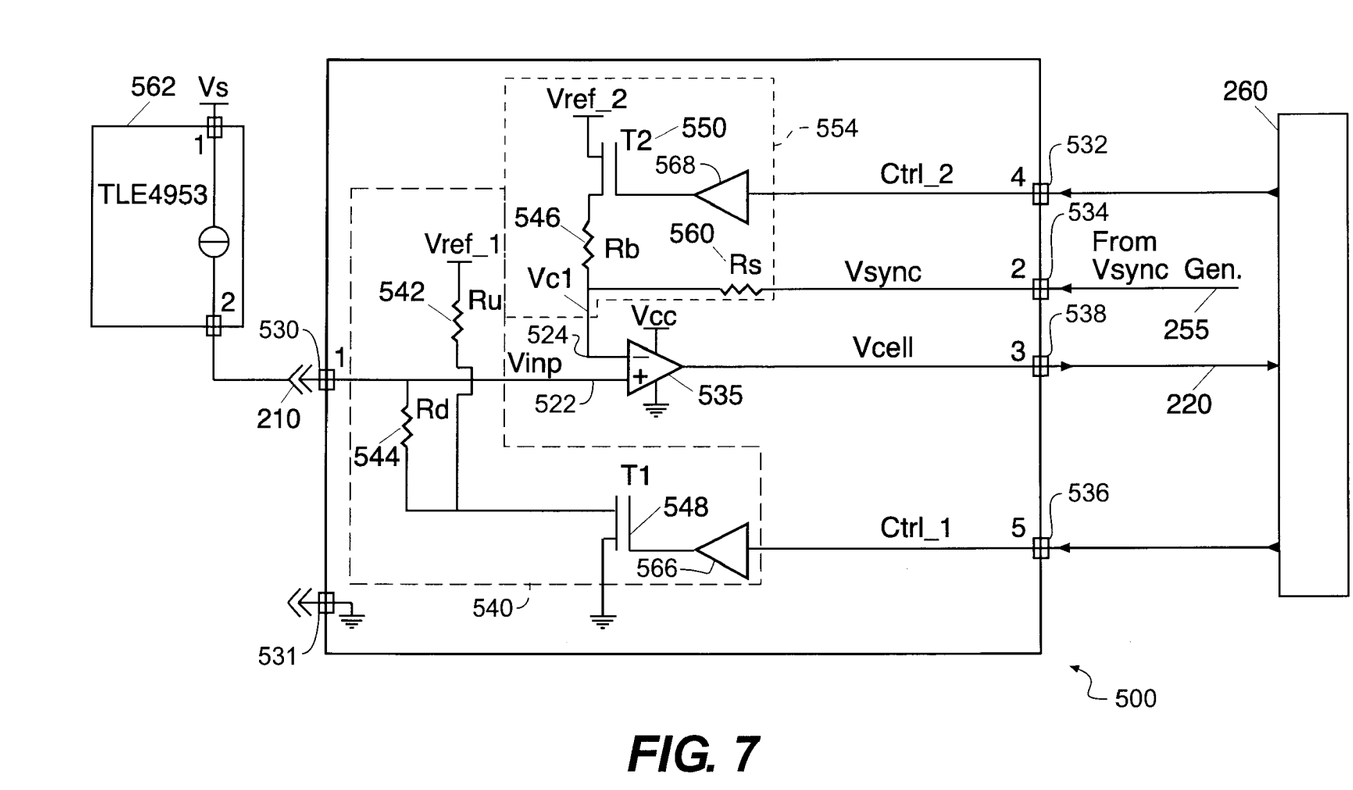
FIG. 7 is a schematic drawing of another embodiment of the adaptive input-cell circuitry, according to the present invention, serving for speed measurements by a two-wire Hall Effect sensor.

Speed Measurements by a Two Wire Hall-Effect Sensor:

The connection of a two-wire Hall-Effect sensor 562, for example Infineon's TLE4953, to the adaptive input-cell 500 of configurable control system 600 is shown in FIG. 7.

This type of sensor needs a pull-down resistor to provide normal operation. This is achieved by configuring first control signal Ctrl_1 signal at first control input 536 to Logic High, causing first electromagnetically controlled switch 548 to provide a path between sensor input 530, resistor Rd 544 and ground G1, thus performing "pull-down" for the two-wire Hall-Effect sensor 562.

The value of resistor Rd 544 should be selected according to two-wire Hall-Effect sensor 562 Low and High state currents, thus determining the voltage drop on resistor Rd 544, and input voltage Vinp on first input 522 of comparator 535. As an example: a Rd value of 250 Ω will yield:

$$Vh = 250\ \Omega \times 14\ \text{mA} = 3.5\text{V}$$

$$Vl = 250\ \Omega \times 6\ \text{mA} = 1.5\text{V}$$

These values are acceptable for the embodiments related to measurements of low and high frequencies.

Measurements of More Input Sensors:

Adaptive input-cell 500 can be configured substantially to operate in a manner similar to that of an input-cell 240, as shown in FIG. 1, by appropriately configuring the first control signal Ctrl_1 and second control signal Ctrl_2. This will enable measurement and control of more sensors as detailed in WO 2005/029207.

For example, sensors, such as analog output sensors, proximity sensors, and optical switches discussed in WO 2005/029207 can be measured by adaptive input-cell 500, provided that second control signal Ctrl_2 is configured to Logic High, and first control signal Ctrl_1 can be configured Logic Low or High according to type of sensor.

It will be appreciated that an input-cell 240 can be provided, created assembled manufactured fabricated, or formed on a common substrate with one or more signal acquisition module 260, a synchronization control module 270, and/or control logic module 370 so that, for example, a complete configurable control system 600 can be provided at low cost, and with greater reliability and smaller size than existing multi-port control system.

It will be further appreciated, by persons skilled in the art, that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention has been described in detail with particular reference to certain preferred embodiments thereof, but it will be understood that variations and modifications can be effected within the spirit and scope of the invention.

PARTS LIST 200 digital unit
210 input pin
215 resistors
220 comparator output signal
235 comparator
236 first input
238 second input
240 input-cell
250 synchronizing signal generator
255 synchronization input
260 signal acquisition module
270 synchronization control module
275 sync data
280 output control logic modules
290 output reference data
310 high-side switch control
320 high-side switch
330 low-side switch control
340 low-side switch
350 high-side output drivers
360 low-side output drivers
370 control logic module
380 output pins
500 adaptive input-cell
522 first input of comparator
524 second input of comparator
530 sensor input 531 sensor input
532 second control input
534 waveform input
535 comparator
536 first control input
538 output
540 pull-up/pull-down selection circuit
542 resistor Ru
544 resistor Rd
546 resistor Rb
548 first electromagnetically controlled switch
550 second electromagnetically controlled switch
552 resistor Rt
554 reference control circuit
558 speed sensor
560 resistor Rs
562 Hall-Effect sensor
566 buffer
568 buffer
600 configurable control system
Ctrl_1 first control signal
Ctrl_2 second control signal
G1 ground
Vcell output. voltage
Vc1 reference voltage
Vinp input voltage
Vref_1 source of first voltage reference
Vref_2 source of second voltage reference
Vsync synchronization voltage

The invention claimed is:

1. A configurable control system comprising:
a synchronization control module;
a plurality of configurable signal acquisition modules connected with said synchronization control module;
a control logic connected with said plurality of signal acquisition modules;
a plurality of identical input-cells respectively connected with said plurality of signal acquisition modules and with a respective plurality of input pins; and
a synchronization signal generator connected with said synchronization control module and with said plurality of input-cells, with each one of said plurality of input-cells being operable to convert input signal parameters into time based parameters and with each of said plurality of signal acquisition modules being configured to convert said time based parameters to a required digital form, said input-cell comprising:
a comparator having a first input, a second input and an output;
a first combination of resistors connected in series between a first reference voltage source and the first input of the comparator;
a first electromagnetically controlled switch connected in series between at least one of the resistors in the combination and a ground wherein said first electromagnetically controlled switch is operated in response to a bias control signal from the signal acquisition module to switch between one switch state causing a pull-up bias to be applied to one of the input pins and another switch state causing a pull-down bias to be applied at said one of the input pins;
a second combination of resistors connected between a second reference voltage source, an input to receive a waveform signal from said synchronization control module and the second input of said comparator; and
a second electromagnetically controlled switch connected in series between at least one of the resistors in the second combination and the second reference voltage source, said second electromagnetically controlled switch being selectively switchable, in response to a bias control signal from the signal acquisition module, between one switch state causing said waveform signal to be applied to said comparator and another switch state causing bias and attenuation of said waveform signal to be applied to said comparator.

2. The configurable control system of claim 1, wherein said comparator is adapted to receive an input signal from said input signal pin, and a synchronization signal from said synchronization signal generator and to generate a comparator output a signal to said signal acquisition module.

3. The configurable control system of claim 1, wherein said first electromagnetically controlled switch and second electromagnetically controlled switch are one of: a N-Channel Field Effect Transistor, a P-Channel Field Effect Transistor, an opto-coupler, and a relay.

4. The configurable control system of claim 1, wherein at least one of the first electromagnetically controlled switch and the second electromagnetically controlled switch transitions from a state conducting electricity to a state that does not conduct electricity in response to an electrical signal, an optical signal or a magnetic signal.

5. The configurable control system of claim 1, wherein said input-cell is created, assembled, manufactured, fabricated or formed on a common substrate with at least one of said synchronization control module, said control logic and said synchronization signal generator.

6. A method of acquiring a plurality of signals comprising the steps of:
providing a synchronization control module, configuring a plurality of configurable signal acquisition modules connected with said synchronization control module;
providing a control logic connected with said plurality of signal acquisition modules;
providing a plurality of input-cells respectively connected with said plurality of signal acquisition modules, each operable to convert input signal parameters into a plurality of time-based parameters;
providing a synchronization signal generator connected with said plurality of input-cells acquiring a plurality of input signals, each said input signal acquired by one of said plurality of input-cells;
converting said acquired input signal into a plurality of time-based parameters; and
converting said plurality of time-based parameters into a digital form, wherein said converting of said acquired input signals into a plurality of time-based parameters is controlled by first and second electromagnetically controlled switches within the plurality of input-cells.

7. The method of claim 6, wherein said signal acquisition module connected to one of said input-cells is configured to control said first and second electromagnetically controlled switches according to the type of parameters characterizing the input signal acquired by said one of plurality of input-cells.

8. The method of claim 7, wherein said steps of converting said acquired input signals into a plurality of time-based parameters and converting said time-based parameters into a required digital form are performed based upon externally supplied electromagnetic signals that control the first and second electromagnetically controlled switches.

9. A method for operating an input-cell, the method comprising the steps of:
receiving a sensor input signal, a digital-bias first control input and second control input;

using a first resistor network to apply an analog pull-up bias to the sensor input signal when the bias of the first control input is in a first digital state and, to provide a path for at least a portion of the first resistor network to a ground to cause the first resistor network to apply a pull-down bias to the sensor input signal when the bias of the first control input is in a second digital state;

receiving a voltage reference and a synchronization input;

using a second resistor network to apply a synchronization input to a comparator when the bias of the second control input is in a first digital state and, to apply a biased and attenuated input waveform signal to the comparator when the bias of the second control input is in a second digital state; and comparing the biased sensor input signal to the waveform applied by the second resistor network to determine an input-cell output, so that the input-cell can convert the sensor input signal to a time-based parameter.

10. The method of claim 9, wherein said input waveform signal is a saw-tooth signal.

11. An input-cell comprising:

a comparator having a first input, a second input and an output, said comparator generating an output signal based upon a comparison of the signals at the first comparator input and the second comparator input;

a sensor signal acquisition circuit having:

a sensor signal input to receive a signal from a sensor and to provide the sensor signal to the first input of the comparator;

a resistor network comprising a plurality of bias resistors connected in series between a first reference voltage and the sensor signal input;

a first electromagnetically controlled switch connected between at least two of the plurality of bias resistors and a ground, said first electromagnetically controlled switch transitioning in response to a first bias control signal between a condition wherein the first electromagnetically controlled switch provides an electrical connection between the first resistor network and the ground and, a condition wherein the first electromagnetically controlled switch does not provide such an electrical connection; and an externally controllable reference control circuit comprising:

a synchronization input connected to the second input of the comparator with a first reference resistor connected therebetween; and a second electromagnetically controlled switch connected between a second reference voltage source and the second input of the comparator with a second reference resistor therebetween, said second electromagnetically controlled switch transitioning in response to a second bias control signal between a condition that defines an electrical connection between the second reference voltage, the second reference resistor and the second input of the comparator and a condition that does not define such an electrical connection, so that the synchronization input at the second input of the comparator can be biased and attenuated.

12. The input-cell of claim 11, wherein said comparator is adapted to receive an input signal from an input signal pin, and a synchronization signal from a synchronization signal generator and to generate a comparator output signal to a signal acquisition module.

13. The input-cell of claim 11, wherein said first electromagnetically controlled switch and second electromagnetically controlled switch are one of: a N-Channel Field Effect Transistor, a P-Channel Field Effect Transistor, an opto-coupler, and a relay.

14. The input-cell of claim 11, wherein at least one of the first electromagnetically controlled switch and the second electromagnetically controlled switch transition from a state conducting electricity to a state that does not conduct electricity in response to an electrical signal, an optical signal or a magnetic signal.

15. An input-cell comprising:

an analog comparator having a first comparator input, a second comparator input and an output said comparator adapted to generate a comparator output signal at an output that indicates whether an amplitude of a signal at the first input is greater than an amplitude of the signal at the second input;

a first switch having a first control line adapted to receive a first digital control signal, and to transition between an open state and a closed state in response to the first digital control signal, said first switch connected to the first comparator input and to a first resistor network to apply a pull-up bias at the first input when the switch is in one of the open states or the closed states, and to apply a pull-down bias at said input signal when the switch is in a different state; and a second switch having a second control line adapted to receive a second digital control signal and to transition between an open state and a closed state in response to the second digital control signal; said second switch being electrically connected to a synchronization input, the second comparator input and a second resistor network to subject a waveform provided by the synchronization input to a different bias and attenuation when the second switch is in the closed state than when the second switch is in the open state.

16. An input-cell comprising:

a comparator having a first comparator input, a second comparator input and an output, said comparator generating a comparator output signal based upon comparison of signals at the first and second input;

a first resistor and second resistor connected in series between a first voltage reference source and a sensor input connected to the first input of the comparator;

a first switch connected to the first and second resistors and a ground, said first switch adapted to receive a signal from a first control line and to switch in response to the signal received from the first control line so that the first and second resistors provide different biases to the sensor input on the first input when the first switch is closed and when the first switch is open;

a third resistor and fourth resistor connected in series between a second reference voltage source; and a second switch and a synchronization input, said third resistor and fourth resistor connected to said second comparator input;

said second switch being connected to a second control line and to receive a signal from the second control line to either apply the waveform input to the second comparator input or apply a biased and attenuated waveform input to said second comparator input, so that a control circuit logic of the input-cell but connected thereto can selectively adjust the bias applied to the sensor input and adaptively define the signal to which the sensor input is compared.

* * * * *